Sept. 29, 1942.   W. M. VON TANNENBERG   2,297,267
METHOD OF CONNECTING STRUCTURAL PARTS OR PLATES BY MEANS OF STAPLES
Filed April 9, 1938    2 Sheets-Sheet 1
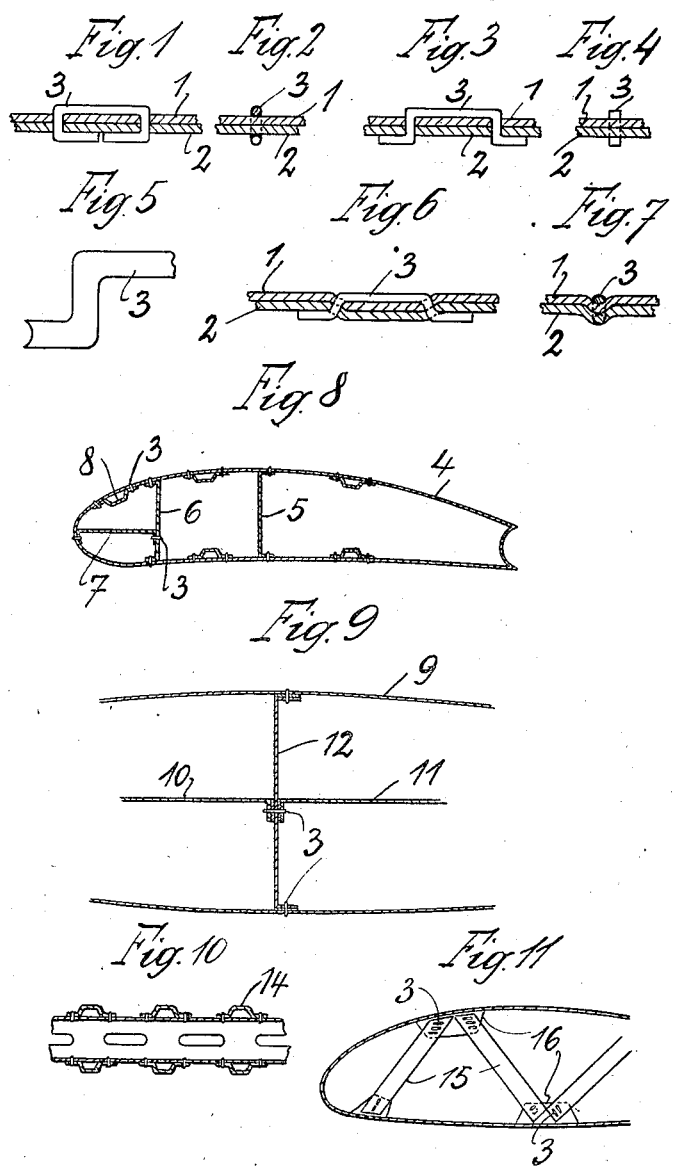
Inventor:
Walter Meinel von Tannenberg,
by Frank S. Appleman,
attorney.

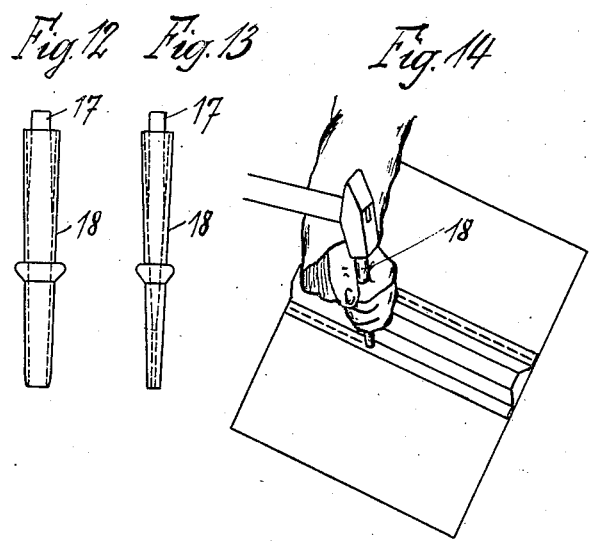
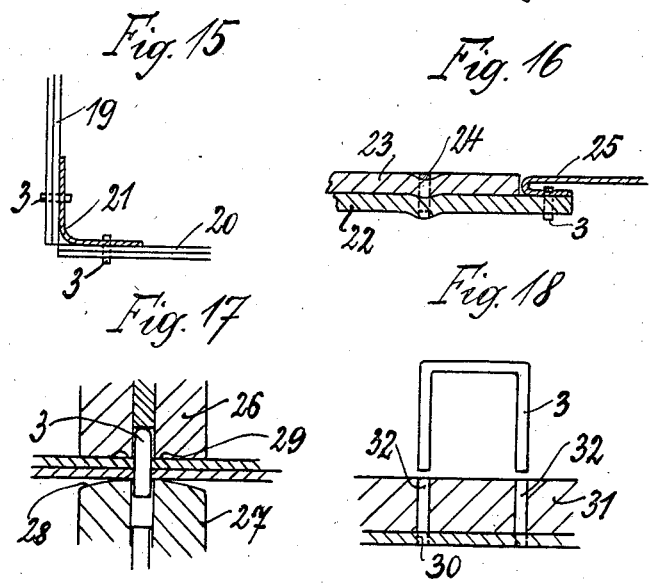

Patented Sept. 29, 1942

2,297,267

UNITED STATES PATENT OFFICE 2,297,267

METHOD OF CONNECTING STRUCTURAL PARTS OR PLATES BY MEANS OF STAPLES

Walter Meinel von Tannenberg, Bremen, Germany; vested in the Alien Property Custodian Application April 9, 1938, Serial No. 201,155
In Germany October 1, 1936

3 Claims. (Cl. 1—2)

This invention relates to staple-like connecting means and consists primarily in the use in connection with the building of metal structures in which materials have to be connected which owing to their high specific strength and thickness have hitherto been connected only by rivets or screws after previous drilling of holes.

Hitherto such parts were not connected by staples. Only such connections of soft materials were possible which, however, were not suitable for high quality light building constructions. For this purpose the staples were forced through the metal like nails. Tearing at the points of passage and other objections became apparent which made it impossible to connect high quality constructions by these means.

The invention overcomes these objections and renders it possible to connect high quality constructional materials in that, at the connecting points, the staples themselves acting like a punching tool punch the material out of the parts to be connected at the points of connection and do not merely push the material aside or tear it, whereupon after this punching operation the staples are clinched over and serve as permanent connecting means. The invention enables the production of a force transmitting connection of constructional elements in a manner hitherto impossible, in that the hole through the parts to be connected is punched out by means of the connecting means, whereas hitherto the hole was broached or wedged open. For this purpose the ends of the staple, as can be seen particularly from the accompanying drawing, have a cutting face preferably at right angles to the longitudinal axis of the end portions of the staple thereby enabling the staples to punch the material to be connected. Thus plates of great strength and thickness can be punched by means of the staples and immediately thereafter be rigidly connected by bending over the ends of the staple. The backs of the staples and also the ends of the arms themselves may also be pressed in known manner into the parts to be connected so that smooth surfaces similar to those obtained by countersunk rivets or screws are ensured. The connection according to the invention possesses the additional advantage that at the same time it increases the strength of the parts to be connected as both the capacity to resist thrust stresses and also the bending resistance are considerably increased by the staples.

Moreover this connection is cheap to produce and light in weight. Such connections can be made in any desired number and opposite positions without materially weakening the construction elements.

The invention relates to the connection of construction elements in which staples, preferably of oval wire cross-section, are employed and the holes for the passage of the staple arms are made by the staples themselves. These passage holes, at least in one of the elements to be connected, are punched by the ends of the staples themselves, these ends being constructed as cutting tools and preferably have a cutting face which extends perpendicularly to the longitudinal axis of the staple arms.

The invention consists in that holes are punched by the staples out of only one of the construction elements to be connected and further in that one or both of the staple ends has or have a recessed cutting face.

Several embodiments of the invention are illustrated by way of example in the accompanying drawings, in which:

Fig. 1 shows in vertical section the connection of two plates by a staple.

Fig. 2 is a vertical section taken at right angles to Fig. 1.

Figs. 3 and 4 show in similar views a modified connection.

Fig. 5 shows on a larger scale one recessed end of a staple.

Figs. 6 and 7 are similar views to Figs. 1, 2 and 3, 4 showing a third form of connection.

Fig. 8 shows in cross section on a smaller scale the construction of an aeroplane wing.

Fig. 9 is a vertical section showing the construction of a float or ship's hull.

Fig. 10 shows in longitudinal section a reinforced girder.

Fig. 11 is a part cross section of an aeroplane wing with diagonal struts.

Figs. 12 and 13 show in front and side elevation respectively a tool for subsequently fixing staples at places inaccessible by a machine.

Fig. 14 is a perspective view showing the use of the tool illustrated in Figs. 12 and 13.

Fig. 15 shows the connection of an angle piece by means of staples.

Fig. 16 is a section of a workpiece with two different connections by means of staples.

Fig. 17 is a sectional view showing the fitting of a staple connection in thin plates.

Fig. 18 shows in section the connection between a thick workpiece and a thin plate.

According to Figs. 1 and 2 two plates 1 and 2 are connected by a staple 3. Plates can be connected in a similar manner with section material. In this connection the web and the arm ends rest upon the surface of the plate. In these figures the ends of the staple arms are bent inwards whereas in Figs. 3 and 4 they are bent outwards. The end faces of the arms may be recessed or cupped to form a cutting face as shown in Fig. 5.

Figs. 6 and 7 show a connection in which the web of the staple is flush with one side of the connected plates whereas the portion of material between the arms of the staple is flush with the bent over ends of these arms.

The staples shown in Figs. 1 to 5 are of round cross section, whereas those shown in Figs. 6 and 7 are of oval cross section. The staples are preferably made of a material of greater strength than that of the material of the construction elements to be connected.

In the construction of the aeroplane wing shown in Fig. 8 the outer skin 4 is connected with stays 5, 6 and reinforcing girders 7, 8 by means of staples 3.

In Fig. 9 the outer wall 9 of a float or ship's hull is stiffened by longitudinal frames 10, 11 and transverse frames 12 secured by means of staples 3. A packing 13 is inserted between the points.

Fig. 10 shows the reinforcement of a girder by means of transverse ribs 14.

In Fig. 11 the diagonal struts 15 are connected with gusset plate 16 by means of staples 3.

Figs. 12, 13 and 14 show a connection of construction elements by means of staples which must be subsequently fixed at places which are inaccessible with a machine. For this purpose a hand tool 17, 18 is provided which serves for holding the staples and by which the staples are driven into the construction elements by means of a ram 17.

Fig. 15 shows a connection in which wooden parts 19, 20 are connected with angles or other section plates 21 by means of staples 3.

According to Fig. 16 the elements 22, 23 are connected by a cornered staple 24, and a pliable element 25 is connected to the element 22 by a staple 3.

For avoiding distortions of thin plates by the punching operation, a guide 26 for the staple 3 and a counter tool 27 are constructed as shown in Fig. 17 in such a manner that they assume a preliminary tension in the opposite direction to the deformation of the plates during the punching operation. This is attained in that the holding of the construction elements is effected by a suitable shaping, especially curving, of the holding means, comprising a guide 26 and a tool 27 having a crowned or convex curved end face 28, whereas the guide 26 has a backed off portion 29.

When one of the elements to be connected is a thin plate and the other relatively thick as shown in Fig. 18, the holes 30 are punched in the thin plate by the staple 3 whereas the holes 32 in the thicker element 31, for example a girder, are bored, the arms of the staple 3 passing through these holes 32.

I claim:

1. That method of connecting constructional sheets by stapling which consists in providing a staple having parallel arms with end faces constituting material removing cutting punches, forming in one of the sheets to be connected guide openings spaced to receive the arms of the staple, placing said sheet over a metal sheet, inserting the arms in said openings, and forcing the arms of said staple through the metal sheet and thereby removing plugs of material corresponding in cross section with the cross sections of said arms.

2. That method of connecting constructional sheets by stapling which consists in providing a staple having parallel arms with end faces constituting material removing cutting punches, forming in one of the sheets to be connected guide openings spaced to receive the arms of the staples, placing said sheet over a metal sheet, inserting the arms in said openings, forcing the arms of said staples through the metal sheet and thereby removing plugs of material corresponding in cross section with the cross sections of said arms, causing said arms to project through the metal sheet until the part of the staple connecting said arms contacts the other sheet, and bending the projecting portions of said arms against the metal sheet in forcible engagement therewith.

3. That method of connecting constructional sheets by stapling which consists in providing a staple having parallel arms with end faces constituting material removing cutting punches, forming in one of the sheets to be connected guide openings spaced to receive the arms of the staples, placing said sheet over a metal sheet, inserting the arms in said openings, forcing the arms of said staple through the metal sheet and thereby removing plugs of material corresponding in cross section with the cross sections of said arms, causing said arms to project through the metal sheet until the part of the staple connecting said arms contacts the other sheet, and bending the projecting portions of said arms against the metal sheet in forcible engagement therewith while forcibly pressing the arm connecting part of the staple against the other sheet to depress the portions of the metal sheet over said arms and cause the arm connecting part to lie flush in the other sheet.

WALTER MEINEL v. TANNENBERG.